(12) United States Patent
Rudy et al.

(10) Patent No.: US 8,286,034 B2
(45) Date of Patent: Oct. 9, 2012

(54) ACCURATE FAULT STATUS TRACKING OF VARIABLE ACCESS SENSORS

(75) Inventors: David A. Rudy, Stoneham, MA (US); Robert J. Hueston, Stoneham, MA (US); Michael E. Poh, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 324 days.

(21) Appl. No.: 12/839,587

(22) Filed: Jul. 20, 2010

(65) Prior Publication Data

US 2012/0023367 A1  Jan. 26, 2012

(51) Int. Cl.
*G06F 11/00* (2006.01)
(52) U.S. Cl. ............... 714/44; 714/25; 714/48; 714/56
(58) Field of Classification Search ............ 714/25, 714/40, 41, 44, 48, 56
See application file for complete search history.

(56) References Cited

U.S. PATENT DOCUMENTS

| | | | | |
|---|---|---|---|---|
| 6,892,159 B2* | 5/2005 | Weiss et al. | | 702/130 |
| 7,082,488 B2* | 7/2006 | Larson et al. | | 710/301 |
| 7,131,030 B2* | 10/2006 | Gilstrap et al. | | 714/25 |
| 7,168,007 B2* | 1/2007 | Gilstrap et al. | | 714/37 |
| 7,188,205 B2* | 3/2007 | Le et al. | | 710/300 |
| 7,716,334 B2* | 5/2010 | Rao et al. | | 709/226 |
| 7,844,866 B2* | 11/2010 | Austen et al. | | 714/57 |
| 2009/0013335 A1* | 1/2009 | Hung et al. | | 719/321 |
| 2009/0089624 A1* | 4/2009 | Austen et al. | | 714/39 |
| 2009/0198549 A1* | 8/2009 | Kearns et al. | | 705/8 |

* cited by examiner

*Primary Examiner* — Joshua P Lottich
(74) *Attorney, Agent, or Firm* — Marsh Fischmann & Breyfogle, LLP; Kent A. Lembke

(57) ABSTRACT

A method for accurately tracking fault status in a computer system. The method includes storing a prior state for a sensor associated with a component of the computer system and receiving a sensor reading. When the prior state indicates the sensor was unavailable or unreadable such as when the component was removed, the method includes resending or re-emitting a faulty event to the fault diagnosing module, e.g., after reinsertion of the component in the computer system while it is still faulty. The method may include, prior to the triggering of the resending of the faulty event, determining that the sensor is in a non-nominal state. The method may also include storing in the data storage a definition of a nominal state for the sensor such that the determining the sensor is in the non-nominal state includes comparing one or more sensor readings with the nominal state definition.

20 Claims, 4 Drawing Sheets

ACCURATE FAULT STATUS TRACKING OF VARIABLE ACCESS SENSORS

BACKGROUND

1. Field of the Description

The present description relates, in general, to monitoring of components of a computer system such as field replaceable units (FRUs) and the like, and, more particularly, to a method and system of tracking fault status of sensors such as those provided on FRUs and other portions of a computer system to address problems associated with the removal of a faulty FRU and its replacement (e.g., with the same or a differing faulty FRU) and other operating challenges (e.g., loss of power) that can result in improper identification of operating states within a computer system.

2. Relevant Background

There has been significant progress made in recent years that facilitate accurate monitoring of operation of computer systems. For example, management of servers and systems with servers has been standardized through the use of Intelligent Platform Management Interface (IPMI) and other tools. IPMI facilitates interconnection of a central processing unit (CPU) and devices being managed by providing replication of monitoring functions from server to server and supporting large numbers of monitoring devices. IPMI is an industry standard, hardware management interface specification that provides an architecture defining how unique devices can communicate with the system controller or service processor, which runs embedded software and controlling firmware (sometimes referred to as a Baseboard Management Controller (BMC)).

One example of the management functions facilitated by the IPMI is monitoring server operations such as the operating status of field replaceable units (FRUs). FRUs are circuit boards, parts, or assemblies of a computer system that may be replaced often while the computer system is running (e.g., via hot swapping). To this end, the IPMI may receive information from the FRU and/or from sensors on each FRU, which may allow it to determine FRU presence (e.g., is a processor blade plugged into a server) and its present operating state (e.g., operating within predefined ranges (or "OK") or faulty based on sensor readings). Typically, according to the IPMI standard, the IPMI software or module may act to transmit an event to a fault manager or fault diagnosing module upon a state change of a sensor (such as a change from OK to faulty).

While generally providing adequate state information to determine faults in FRUs and other monitored components, the existing standardized monitoring techniques or guidelines do not address all operational situations, and this can result in an inaccurate state being reported to a system controller or other management devices. For example, some sensors can become unreadable such as a sensor located on an FRU that is removed or a sensor that is not readable when one or more power domains is turned off.

With regard to the FRU example, a sensor may transition to faulty, and the IPMI software processes this transition information from the sensor. As a result, an event is sent to the fault manager or fault diagnosing module of the system controller, which, in turn, diagnoses the FRU as faulty. When the faulty FRU is removed from the computer system, the sensor becomes unreadable. Based on FRU presence information, the IPMI software notifies the fault manager that the FRU was removed from the computer system, and the fault manager deletes the fault as having been serviced or corrected. A problem situation can now arise, though, if the FRU is re-inserted while still faulty (or a new FRU that is faulty is inserted), the IPMI module (or its sensor logic) will not detect any transition because being unreadable was treated as a temporary status according to the IPMI specification and not a state change. As a result, no event is sent by the IPMI module, and the fault manager will not report to a system controller or other management devices that the FRU is faulty.

Hence, there remains a need for methods and systems for providing more accurate tracking of fault status of sensors such as those provided on or with FRUs. Preferably, such methods and systems would at least provide a solution to the example provided above regarding insertion of a faulty FRU or an FRU with a latent fault.

SUMMARY

Briefly, methods and systems are provided that enhance accuracy of fault status tracking in sensors used to monitor operation of computer components, such as sensors associated with field replaceable units (FRUs) (e.g., a blade processor or a fan of a server). The methods and systems allow a fault diagnosing application to better track status at the FRU level by triggering resending of fault events (or similar messages/communications) to the fault diagnosing application. Resending occurs, for example, when it is determined that a component such as an FRU that has entered a fault state is removed and then is reinserted (or a new FRU is inserted) while still in a fault state. In one embodiment, a poller or polling mechanism is layered on an intelligent platform management interface (IPMI) to initiate or trigger resending of an IPMI fault event when it determines that a sensor that had been unreadable/unavailable (i.e., prior state stored in memory indicates sensor was unreadable) is now readable/available but is presently in a non-nominal state (e.g., by comparing a sensor reading(s) with a nominal state definition such as a threshold for an acceptable operating range).

More particularly, a method is provided for tracking fault status in a computer system. The method includes using a system controller (e.g., processor(s), firmware, and software) to provide a polling module and a fault diagnosing module in the computer system. The method also includes storing, in data storage, a prior state for a sensor associated with a component of the computer system and then receiving a sensor reading including a present state of the sensor. When the prior state of the sensor is an unreadable state, the method includes triggering the resending or re-emitting of a faulty event to the fault diagnosing module. In some cases, the component is a field replaceable unit (FRU), the sensor enters the unreadable state when the FRU is removed from the computer system, and the receiving of the sensor reading occurs after the FRU is reinserted into the computer system.

The method may also include, prior to the triggering of the resending of the faulty event, determining with the polling module that the sensor is in a non-nominal state. In such cases, the fault diagnosing module acts to report the component as present and faulty. The method may then also include storing in the data storage a definition of a nominal state for the sensor such that the determining that the sensor is in the non-nominal state includes accessing the data storage and comparing the present state with the nominal state definition. Further, the prior state stored in data storage may include one or more readings from the sensor related to operation of the component, and the step of determining the sensor is in the non-nominal state may include processing the one or more readings with the present state of the sensor to determine whether the sensor complies with the nominal state definition. Further, the system controller may be configured to provide an intelligent platform management interface (IPMI), and, in such cases, the step of triggering of the resending of the faulty event may include instructing or signaling the IPMI to send an IPMI event to the fault diagnosing module. Still further, the IPMI event may include a previously sent IPMI fault event for the sensor.

According to another aspect, the description teaches a computer system with accurate fault status tracking of sensors. The system includes a field replaceable unit (FRU) and a sensor associated with the FRU operating to transmit sensor readings associated with operating status of the FRU. Additionally, the system includes a system controller including an intelligent platform management interface (IPMI) module and a fault diagnosing module. The IPMI module operates, in response to the sensor readings, to emit IPMI events to the fault diagnosing module for diagnosing status of the FRU, and the IPMI module also operates to re-emit at least a portion of the IPMI events to enhance the accuracy of the FRU status diagnosing. The computer system may also include memory storing a prior state of the sensor, and, in such cases, the IPMI module may re-emit the portion of the IPMI events when the sensor readings are received when the prior state of the sensor is an unavailable state indicating the FRU was removed from the computer system.

In the computer system, the system controller further may provide a poller determining, when the prior state is an unavailable state, whether the sensor is presently in a non-nominal state and, when the sensor is in the non-nominal state, causing the re-emitting at least one of the IPMI events to the fault diagnosing module. The memory may further store a definition of a nominal state for the sensor such that the determining of the non-nominal state by the poller includes comparing one of the sensor readings received after the unavailable state with the nominal state definition. The nominal state definition may include a nominal operating range including at least one threshold value. In some cases, the computer system includes a server, the FRU includes a removable processor, and the IPMI module acts to re-emit the portion of the IPMI events when the sensor transitions from unreadable to readable with a prior state and a present state of the sensor indicated by the sensor readings both being faulty.

According to yet another aspect, the description teaches a computer program product including a computer useable medium and computer readable code embodied on the computer useable medium for performing accurate fault status tracking of sensors associated with components of a computer system. The computer readable code may include: computer readable program code devices configured to cause the computer to receive input from a sensor associated with a component of the computer system; computer readable program code devices configured to cause the computer to access memory to determine whether a stored prior state of the sensor is equal to unreadable; and computer readable program code devices configured to cause the computer to, when the prior state of the sensor is unreadable, resend a previously transmitted fault event to a fault diagnosing application for diagnosing a status of the component.

In some cases of the computer program product, the previously transmitted fault event is resent when the sensor is determined to be in a non-nominal state. The non-nominal state may be determined based on two or more of the inputs received from the sensor to identify a state transition for the component over a period of time. In some embodiments, the determination of the non-nominal state is based on a comparison of the input received from the sensor with a nominal state definition stored in data storage of the computer system, the nominal state definition including a threshold value for the sensor. In some specific applications, the component is an FRU such that the sensor is assigned the unreadable state when the FRU is removed from the computer system, and the resending of the transmitted fault event is performed after the FRU is reinserted, or a replacement FRU is inserted, into the computer system. In other specific examples, the previously transmitted fault event includes an IPMI event, and the IPMI event is resent when a current state of the sensor indicates the component is in a state associated with the previously transmitted fault event.

DETAILED DESCRIPTION OF EXEMPLARY EMBODIMENTS

Figure 1:
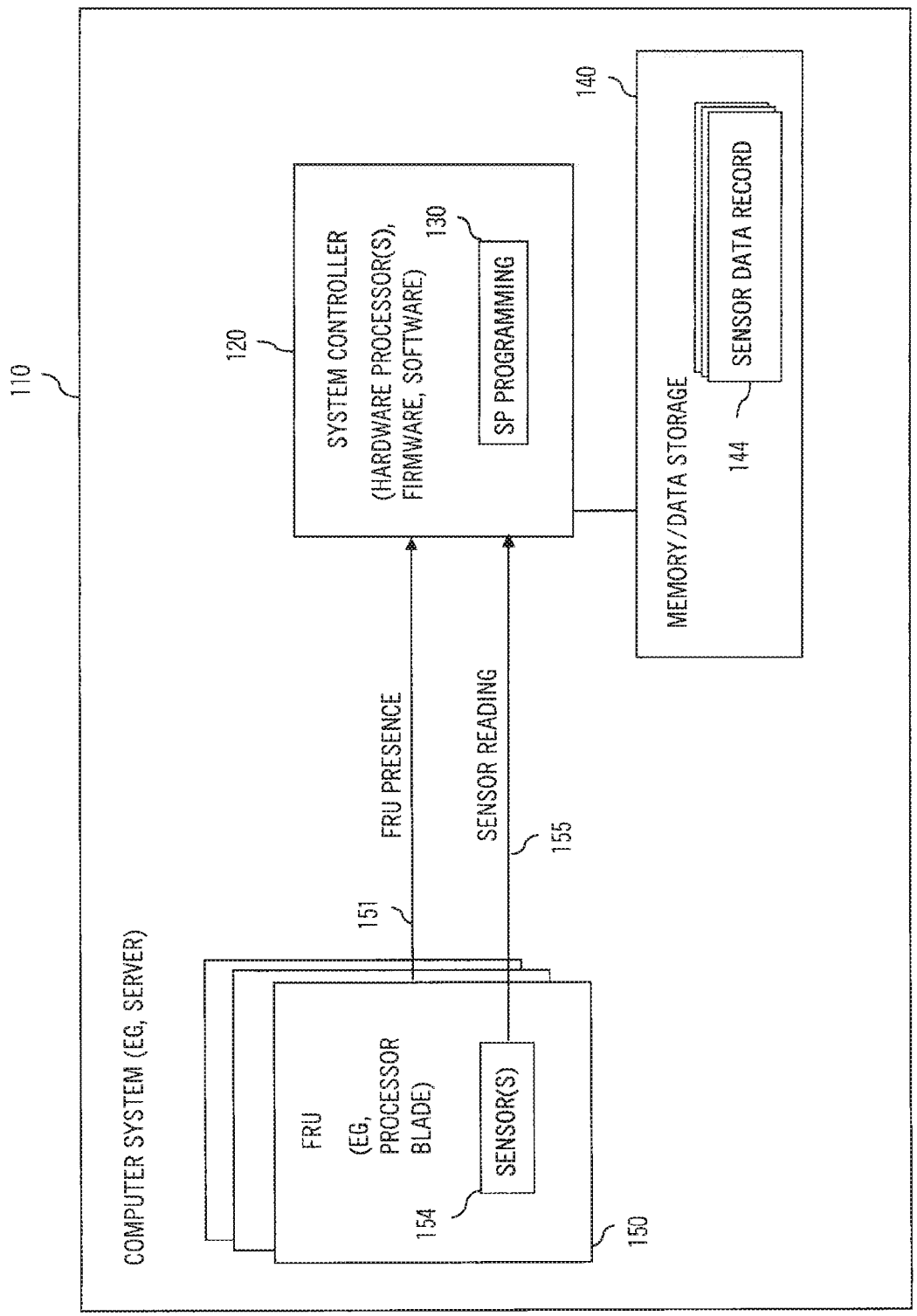
FIG. 1 illustrates, in functional block form, an exemplary computer system useful for implementing the fault status tracking methods of the present description.

Briefly, the following description teaches a method and system for more accurately tracking fault status of variable access sensors. Some particular embodiments are well-suited for tracking fault status of sensors associated with field replaceable units (FRUs) such as a blade processor that may be plugged into a server or the like. The methods and systems include extending the state machine to detect for the special or problematic cases where events would not normally be sent by IPMI (when they are needed to detect latent faults), and upon detection of a special/problematic case, events are re-sent as needed. The resending of events (e.g., by a sensor management interface mechanism such as an IPMI module or IPMI software) enables fault status monitors, such as fault diagnosing modules in a system controller or the like, to correctly represent fault state within a computer system.

The inventors recognized that sensors that become unreadable because of a power state change or FRU hot swap operation pose special problems for systems that monitor fault status by listening for fault event transitions. For example, a sensor may be associated with an FRU, and the sensor may operate to change its state from "OK" indicating acceptable operation of the FRU to faulty indicating unacceptable operation (such as operations outside a nominal or acceptable range). Such a transition in state causes a sensor management interface module (e.g., an IPMI module or IPMI software) to generate an event that is transmitted to a fault diagnosing module or component, which, in turn, diagnoses the fault and issues a fault notification to a computer system manager (or device management module within a system controller or the like). However, if the FRU is now removed, the sensor becomes unreadable, and the fault manager (or fault diagnosing module) is notified by the IPMI module that the FRU was removed, and the fault manager acts to delete the fault as having been properly serviced. If the FRU (or a new but faulty FRU) is re-inserted in the computer system, the IPMI module (or its sensor logic) will not detect any transition. Hence, no event is sent by the IPMI module, and the fault manager does not report this FRU is faulty (even though it is (i.e., presents a latent fault in the computer system)).

The present description, in contrast, teaches a fault status tracking method, and computer system configured to implement such a method, that causes events to be resent by IPMI software (or, more generally, a sensor management interface module) during transitions from unreadable to faulty. Such resending of events for these transitions allows the fault manager (or fault diagnosing module) to correctly diagnose the inserted FRU as being faulty. Generally, the described methods and systems enhance sensor monitoring by treating an unreadable sensor as a known state (not merely as a temporary status). Then, if a sensor is detected or determined (such as by a polling module or poller associated with an IPMI module) to be transitioning from faulty to unreadable and then back to faulty, the faulty status (or an event corresponding to a transition to faulty) is re-sent to any listening fault managers. The fault managers know to ignore duplicate events such that this re-sent event only has effect for faults that were inadvertently removed.

FIG. 1 illustrates a computer system 110 in which such monitoring of sensor fault status may be successfully implemented. The computer system 110 may take on many forms to practice the invention and is generally any combination of hardware, software, and firmware that includes sensors for monitoring components such as FRUs. The computer system 110, for example, may be a server that includes a number of FRUs 150 such as processor blades or other components that may be plugged into the server 110 and removed (e.g., hot swapped) for repair or replacement. The computer system 110 may include a system controller 120 made up of one, two, or more hardware processors (or CPUs), firmware, and software, and the system controller or service processor (SP) 120 may run a set of SP programming (or have a number of programs, applications, or software modules that provide the described functions) 130. The system controller 120 may take the form of a baseboard management controller (BMC) with the SP programming including IPMI software and one or more fault diagnosing modules (see FIG. 2, for example).

The system controller 120 manages memory/data storage 140 of computer system 110 (or remote memory in some cases) for storing sensor data records 144. Each FRU 150 may include one or more sensors 154 such as temperature sensors, memory sensors, voltage sensors, fan sensors, power supply sensors, systems event sensors, event logging disabled sensors, system firmware progress sensors, watchdog sensors, and other operation-status sensing devices. The description is not limited to any particular type of sensor that may be associated with or provided on an FRU 150.

The system controller 120 (or its SP programming 130) receives signals 151 that indicate the presence of an FRU 150 within the computer system 110 (e.g., is a blade processor or other FRU plugged in?). The system controller 120 (or its SP programming 130) also receives signals from sensors 154 providing sensor reading (or status data), which may be a simple OK or faulty indication or may provide other information such as a temperature value, a power use level, and so on that may be used to determine whether the sensor (or its underlying FRU) is in a non-nominal state. The memory 140 may be used by the SP programming 130 to store sensor data records that include information from the sensor readings 155 such as state data (e.g., sensor readable, sensor unreadable, sensor reporting OK, sensor reporting faulty, and the like) and whether the FRU is present (or, in some cases, whether it was recently removed).

Figure 2:
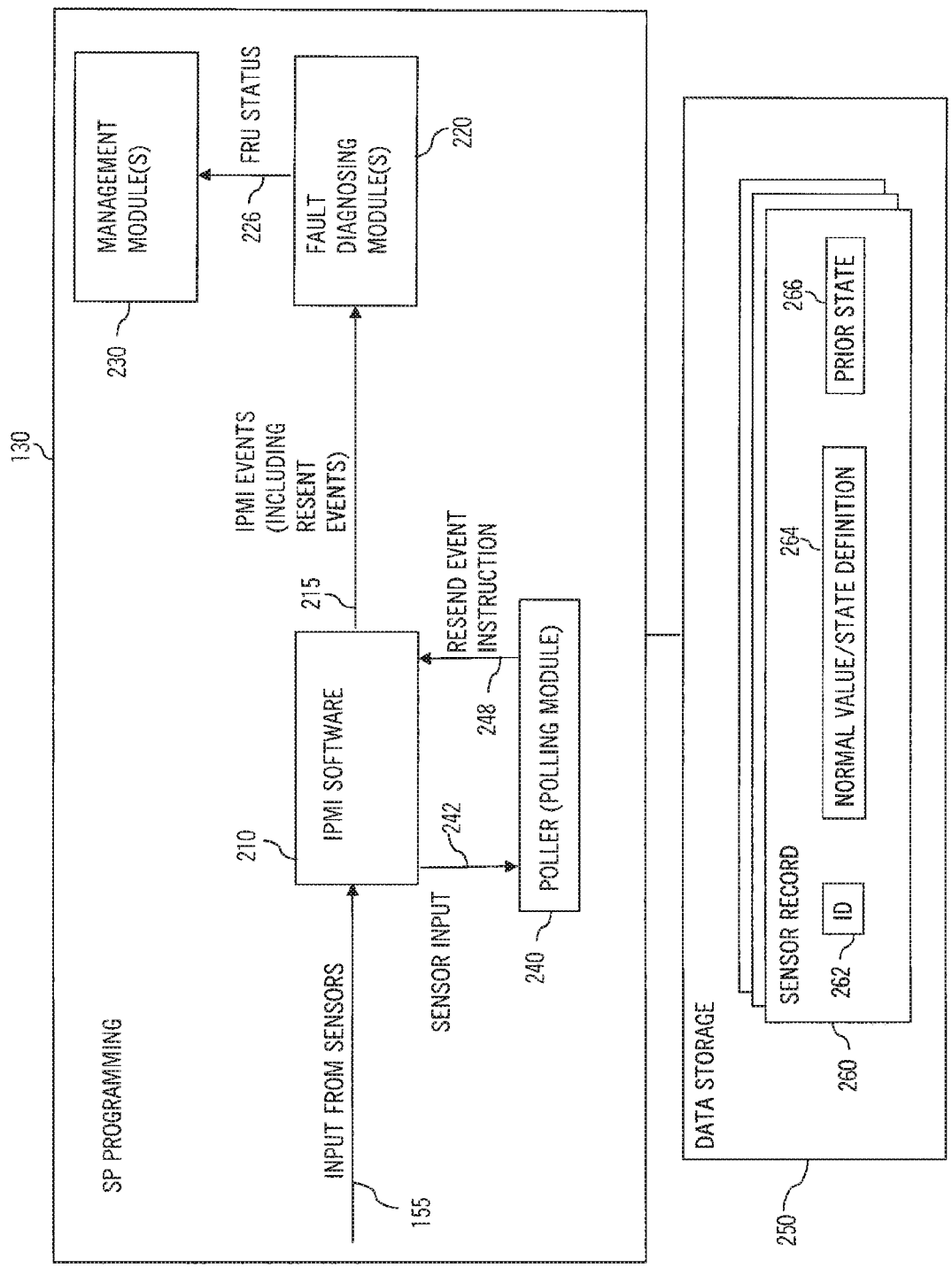
FIG. 2 illustrates in detail portions of the computer system of FIG. 1 including the SP programming module showing use of a poller, poller mechanism, or polling module to cause events to be resent to a fault diagnosing module(s)

FIG. 2 illustrates the SP programming 130 in more detail for an embodiment configured to be compatible with the IPMI standard. As shown, the SP programming 130 includes IPMI software (or an IPMI module/mechanism) 210 that receives input 155 from sensors 154. When the IPMI software 210 determines that a state transition has occurred, it transmits an IPMI event 215 to a fault diagnosing module 220. The fault diagnosing module 220, in turn, processes the event 215 to determine the FRU status 226 for the FRU 150 associated with the event 215 and, in response (or when appropriate), transmits an FRU status signal/communication 226 to a management module 230, which may report out, the state of the FRU or take other appropriate management actions (e.g., report that a re-inserted FRU is still faulty (or a new FRU installed after a previously identified fault is faulty)).

The SP programming 130 includes a poller (or polling module) 240 associated with or layered upon IPMI 210. The poller 240 is generally adapted to determine when a sensor 154 is in a non-nominal state after replacement or reinsertion of an FRU 150. To this end, the poller 240 maintains (or accesses) sensor records 260 in data storage 250. A sensor record 260 is stored for each sensor and may include an FRU ID field 262 (and/or a sensor ID field). The sensor record 260 also includes a prior state value 266 for the sensor 154. The state stored in value 266 may be OK (or acceptable operation) or faulty, but, significant to this description, the value 266 may also be unreadable (or readable).

In use, the poller 240 may act when a sensor is leaving an unavailable or unreadable state 266 to determine if a resend event instruction 248 should be sent to the IPMI software 210 to trigger a resend fault event 215 to fault diagnosing module 220. The poller 240 receives (or listens for) sensor input 242 from IPMI software 210 (or directly from sensors 155), and, for sensors 154 determined to have a prior state of unreadable/unavailable 266, processing is performed to determine if the sensor is in a non-nominal state.

The sensor record 260 includes a nominal value or state definition 264, and the poller 240 compares the sensor input 242 to determine if the received value/state is outside a nominal state or is an unexpected value (e.g., sensor reading indicates FRU 150 is operating over/under a threshold value 264 (or outside a predefined acceptable range)). In some cases, the unexpected value may be a sensor reporting faulty when its prior state 266 was unreadable, which would be unexpected. In other cases, the unexpected or non-nominal state may be an operating reading that is unacceptable (or faulty) such as a temperature above a threshold or time over a particular temperature. The definition of a nominal state for a sensor 154 may vary widely to practice the invention with a key feature being that a nominal value 264 is defined for each sensor 154 to allow the poller 240 to make the comparison to determine when the sensor 154 is in a non-nominal state as a sensor leaves an unavailable/unreadable condition (as indicated in prior state 266). The poller 240 is provided in the SP programming 130 to treat a particular state change as it allows the SP programming 130 to be able to know when a sensor transitioned from an unavailable state whereas in prior system controllers this often would led to a latent fault state (e.g., fault assumed to have been corrected after removal of an FRU previously in fault state).

Figure 3:
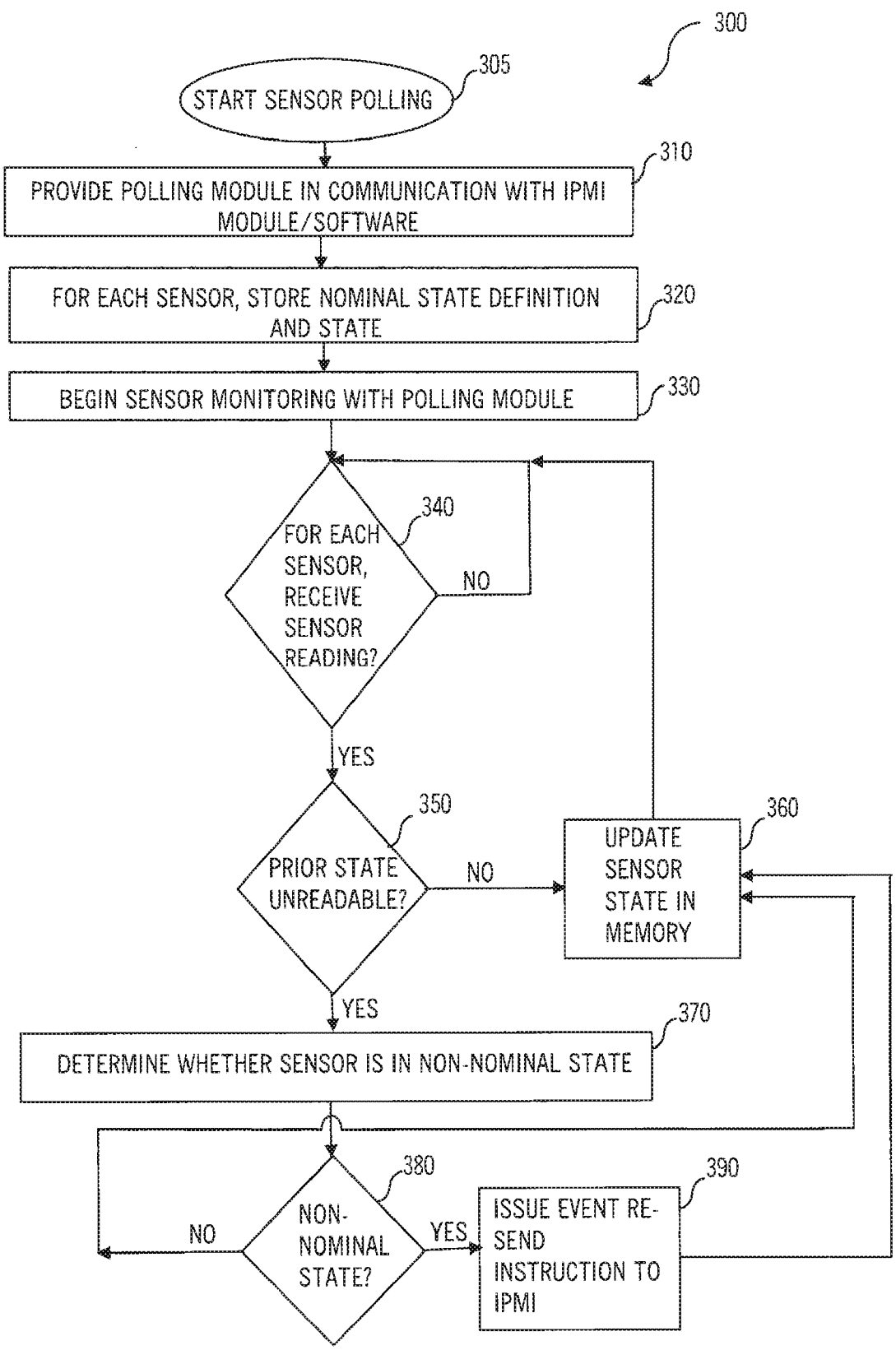
FIG. 3 illustrates sensor monitoring performed by a polling module associated with Intelligent Platform Management Interface (IPMI) software (e.g., the poller and associated IPMI software shown in FIG. 2), with the polling module acting to cause the IPMI to selectively resend fault events to allow proper fault diagnosing by a fault diagnosing module.

FIG. 3 illustrates a sensor fault status tracking method 300 of one embodiment such as may be implemented during operation of computer system 110. The method 300 starts at 305 such as with determination of definitions of non-nominal states for various sensors 154 being used within the computer system 110. At 310, the method 300 includes providing a polling module 240 in communication with the IPMI module 210 (or otherwise adapted to listen for sensor readings/input 155 from sensors 154). The method 300 includes at 320 storing nominal state definitions 264 for each sensor 154 along with the sensors 154 current state (e.g., in state field 266). At 330, the method 300 includes operating the poller 240 to begin sensor monitoring so as to identify and treat the state transition from unreadable/unavailable to a non-nominal state. Note, the poller 240, more generally, operates at 330 to monitor all state transitions with the above-described transition being used in particular to achieve a desired functionality of computer system 110.

At 340, the polling module 240 listens for sensor readings and, for a particular sensor 154, it may receive a sensor reading. If yes, the method 300 continues at 350 with determining whether the prior state 266 in the sensor data record 260 is unavailable/unreadable (or a similar state). If not, the sensor state 266 may be updated at 360 (such as update from OK to faulty, from faulty to OK, from fault or OK to unreadable/unavailable or the like).

Significantly, if a prior state 266 was unavailable/unreadable, the method 300 continues at 370 with determining whether the sensor 154 is presently in a non-nominal state based on the received sensor input/reading(s) 242 (or defining the present state as nominal or non-nominal). This typically may involve retrieving or accessing a nominal value/state definition 264 from data storage/memory 250 along with one or more prior states with the poller 240 and comparing all or a portion of the sensor input/reading 242 with this value/definition 264 and, if necessary, prior state data 266 from memory 250.

For example, the non-nominal definition may be a reading over a threshold value and the reading 242 may be compared with the threshold value to determine if it is exceeded. In other cases, a non-nominal value may be a go/no-go type value (such as OK/faulty) and the comparison may be to see if the reading 155 matches the no-go value (sensor indicates FRU is faulty). However, in some cases, the poller 240 may have to compare one or more prior states 266 along with a present reading 155 to determine if the sensor 154 is in a non-nominal state such as to determine whether the sensor 154 has detected an undesirable transition or has been outside of an acceptable/nominal operating range over a number of sensor readings (which may define a time period such as operating above a temperature threshold for a period of time defined in nominal value definition 265).

At 380, the poller 240 determines if the sensor 154 is in a non-nominal state. If in a nominal state, the method 300 continues at 360 to store the result (and then continue on to 340 with listening/receiving addition sensor readings 242). If the sensor 154 is in a non-nominal state, the method 300 continues at 390 with issuing 248 a trigger signal or instruction to the IPMI software 210 to cause it to resend a prior fault event (or transition to fault state event) to the fault diagnosing module 220. The IPMI events 215 may include one, two, or more previously transmitted events so as to allow the fault diagnosing module 220 to reconstruct the transition history of the sensor 154 to better or more accurately diagnose the current state of the sensor 154 and to then report a proper FRU status 226 to a management module 230. The method 300 may then end at 300 or continue at 340 with ongoing listening for sensor readings so as to identify the state change of interest to the poller 240 (i.e., transition from unreadable/unavailable to a non-nominal state).

As can be seen from the method 300 of FIG. 3, a poller or polling mechanism may be layered on standard IPMI software (or a similar interface module run/executed by a hardware processor(s)). It may be separate from IPMI and fault manager pieces of the SP programming in some embodiments while other embodiments may incorporate its functionality within one of these modules. When a sensor leaves an unavailable condition but is determined by the poller to be in a non-nominal state, the poller triggers or forces a resending by the IPMI of the present state (e.g., resend a fault event that may have been erased/deleted by the fault manager) to ensure more accurate reporting of states at the FRU level (such as to a manager module or other portion of the SP programming, system controller, or other components of a computer system used to manage/report operations of the system). The poller determines when the sensor is in a non-nominal state such as after replacement or reinsertion of an FRU. To this end, the poller stores one or more prior states/readings of sensors in memory/data storage as necessary to make the non-nominal state determination.

In some cases, the non-nominal state is not simply a current state determination but requires reconstruction of two or more sensor readings (or reading history) to determine if the sensor is presently in a non-nominal state. For example, non-nominal may be defined as receiving three consecutive sensor readings above or below a threshold value, and, in such a case, the poller 240 may store at least the prior two states/readings (along with the unreadable/unavailable state) so that the poller can determine the sensor was previously unavailable and can also determine whether three consecutive sensor readings indicate a non-nominal state per the nominal (or non-nominal) state definition 264 stored in memory. The poller stores at least the most recent prior state of each tracked sensor to be able to make a comparison to know when to tell the IPMI to resend the event.

The fault diagnosing or manager module 230 of FIG. 2 is listening for events 215 to allow it to diagnose operating states of the FRUs 150 (or other sensor-monitored components of system 110). The described invention provides a much cleaner state flow. Without the described fault status tracking techniques, the diagnosing module 220 could go into the wrong state at the FRU level. A specific problem case was that it could go into a present and OK (nominal state) after the FRU is first diagnosed as present and faulty and then removed for repair causing it to be in the not present (and sensor unavailable/unreadable) state. Now, the diagnosing module 220 is able to accurately detect when present and faulty at the FRU level after reinsertion of a removed (repaired/replaced) FRU.

Figure 4:
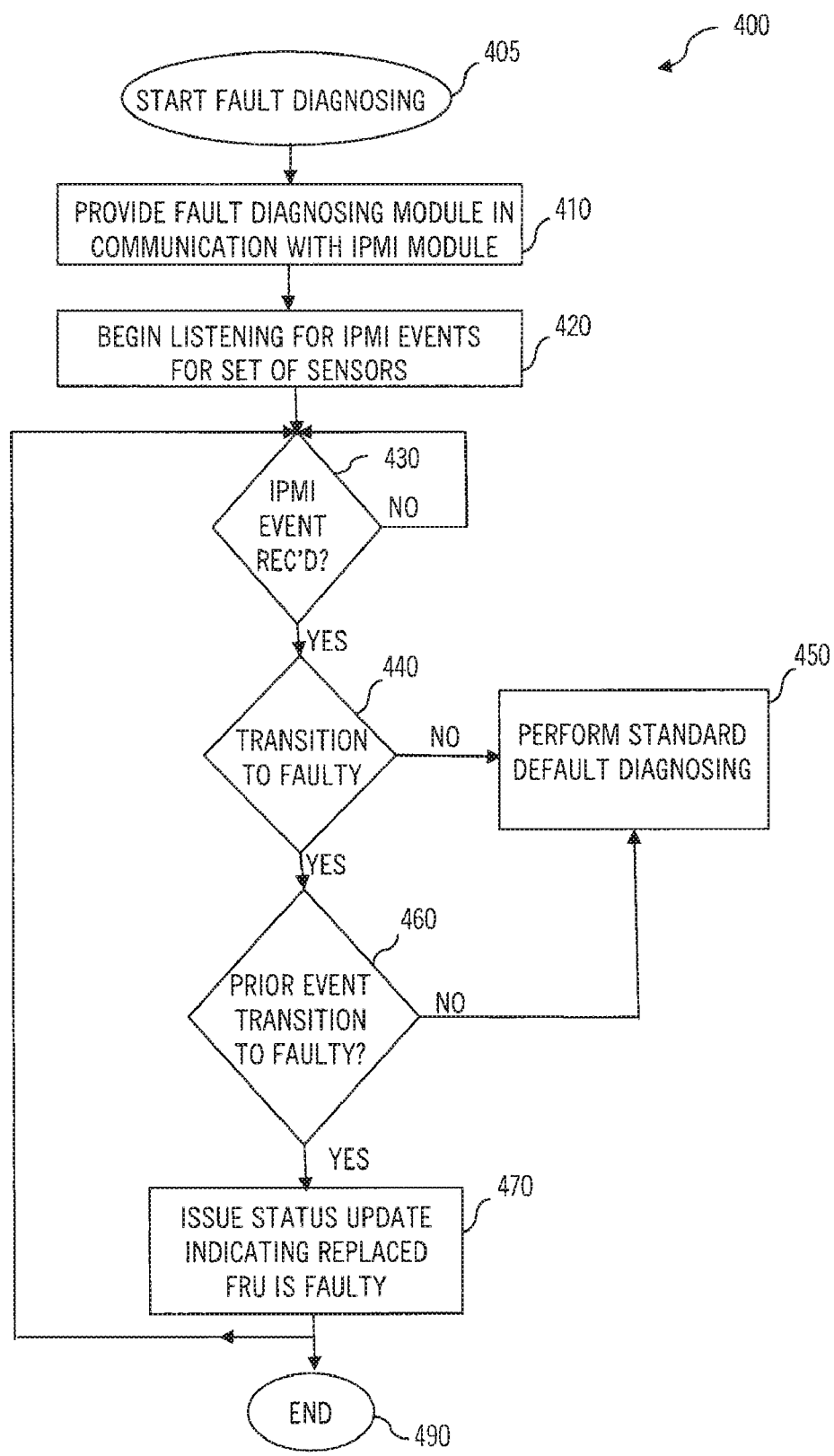
FIG. 4 is a flow diagram of process of fault diagnosing such as may be carried out by the fault diagnosing module of FIG. 2.

Such a diagnosis is performed using the IPMI events 215 including those events 215 resent in response to triggers 248 from the polling module 240. FIG. 4 illustrate in simplistic form one fault diagnosing process 400 that starts at 405 and may be carried out using the SP programming 130 of FIGS. 1 and 2 including the poller 240 and fault diagnosing module 220. The method 400 includes at 410 providing a fault diagnosing module 220 in communication with an IPMI module or software 210 to listen for sensor-generated events for a set of FRUs 150 in a computer system 110. At 420, the method includes listening for IPMI events for a set of sensors 154 associated with one or more FRUs 150.

The method 400 continues at 430 with determining if an IPMI event is received, and, if not, continuing to listen at 430. When an IPMI event is received at 430, the method 400 continues at 440 with determining if the event is a transition to faulty event 440. If not, the method 400 may continue with the fault diagnosing module 220 performing standard or conventional fault diagnosing steps (such as those defined in the IPMI standards or the like). If, in contrast, the event is indicative of a transition to faulty for a sensor 154 at 440, the method 400 continues at 460 with determining whether the prior event received for this sensor 154 was also a transition to faulty. If not, conventional/standard diagnosing may be performed at 450.

If yes (two consecutive faulty events 215 are received as would be the case if a poller triggers a resend of a fault event), the method 400 continues at 470 with the fault diagnosing module 220 acting to diagnose the FRU 150 associated with the sensor 154 for which the IPMI event was resent being present and faulty. In other words, the fault diagnosing module 220 diagnosis the replaced FRU 150 as faulty and reports 226 this operating state to a management module 230 for action. The method 400 may continue at 430 with listening for further IPMI events or may end at 490.

With the above description in mind, it may be useful to provide further discussion of possible embodiments of a fault status tracking system. The inventors recognized that problems may arise in a fault diagnosing device/module (sometimes referred to as "fdd") because the IPMI may function such that it does not re-emit an event (based on sensor readings from a sensor on an FRU) when the sensor transitions from faulty to unreadable to faulty. This causes the fault diagnosing device to clear the fault (in some cases) if an FRU is first diagnosed as faulty and second removed (causing the sensor to be unreadable). However, in the IPMI stack, the sensor is merely unreadable. If a new/repaired FRU is inserted with the same fault, the IPMI does not re-emit the fault event because the second fault detected by a sensor is not a "new" state to the IPMI stack. Thus, the new FRU is never declared faulty by the fault diagnosing device (which may have cleared the prior diagnosed fault upon removal of the FRU/sensor from the computer system). Similarly, on some computer systems, if a voltage fault causes the computer system to power off and then the user attempts to power-on again, IPMI does not re-emit the fault event. Hence, it appears to the user that their computer system is fault-free when in fact it has a critical voltage fault.

To address these issues and provide more accurate fault status monitoring, a poller may be provided that is layered on the IPMI to emit (directly or via the IPMI) sensor events that are beyond those that the IPMI would normally emit. Specifically, the poller is configured to re-emit (or cause to be re-emitted by IPMI) events when a sensor transitions out of the unreadable state. The sensor data records may be extended with a new field to indicate the event's prior state. On a first read, the prior state will be unknown (e.g., sensor read state is unknown). Transitions after that point will normally be sensor read state "OK". When a sensor transitions from unreadable to faulty, the prior state will be sensor read state unreadable.

In some embodiments, the IPMI event receiver may be configured to ignore events with a prior state of sensor read state unreadable so as not to change the IPMI's standard behavior. The poller, though, will perform a determination of whether a sensor is in a non-nominal state when the prior state is sensor read state unreadable so as to determine whether a sensor event should be re-emitted to the fault diagnosing device. The fault diagnosing device may be modified to subscribe to sensor events from the poller and IPMI (e.g., to a Class_Sensor_Events rather than the standard Class_IPMI_Events), which may allow it to not only receive these new events but also remove the 255-sensor limit imposed by IPMI.

To handle voltage and other similar operating problem cases (such as temperature critical threshold crossings), the poller may act to determine a transition has occurred from unreadable to a non-nominal state. When the poller re-emits faults transitioning out of the unreadable state, the fault diagnosing device may handle these new events with rule extensions that indicate to the fault diagnosing device that a particular problem exists in the computer system that may need to be addressed such as a voltage critical event, a temperature critical event, or the like that may require shut down or power off of the computer system.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. Generally, the inclusion of a polling module in the SP programming of a system controller is desirable for a number of reasons. For example, the sensor monitoring is enhanced so as to resend any fault-based events when a sensor transitions from a new unreadable/unavailable state to a non-nominal (or non-OK) state.

Embodiments of the subject matter described in this specification can be implemented as one or more computer program products, i.e., one or more modules of computer program instructions encoded on a computer-readable medium for execution by, or to control the operation of, data processing apparatus. For example, the modules used to provide fault status tracking in computer system 110 such as the SP programming 130 and its modules 210, 220, 230, 240, and the like may be provided in such computer-readable medium and executed by a hardware processor/CPU (or two or more processors) or the like. The computer-readable medium can be a machine-readable storage device, a machine-readable storage substrate, a memory device, a composition of matter affecting a machine-readable propagated signal, or a combination of one or more of them. The computer systems that may use the fault status tracking and may be used to implement such tracking encompass all apparatus, devices, and machines for processing data, including by way of example a programmable processor, a computer, or multiple processors or computers. The system (such as system 110 of FIG. 1) can include, in addition to hardware, code that creates an execution environment for the computer program in question, e.g., code that constitutes processor firmware, a protocol stack, a database management system, an operating system, or a combination of one or more of them.

A computer program (also known as a module, device, mechanism, program, software, software application, script, or code) used to provide the functionality described herein (such as to provide the IPMI, poller, fault diagnosing, and component management functions and the like) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIGS. 1 and 2 are block diagrams illustrating one embodiment of a computer system 110 configured to implement the methods described herein. In different embodiments, computer system 110 may be or include any of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device. The data input 155 from sensors may be provided from one or more devices over a wired and/or wireless connection and/or digital communications network. Likewise, the data stores 140, 250 may be linked by wired or wireless connections and/or replaced by one or more devices accessible by a digital communications network.

Typically, a computer will also include, or be operatively coupled to receive data from or transfer data to, or both, one or more mass storage devices for storing data, e.g., magnetic, magneto-optical disks, flash or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

We claim:

1. A method for tracking fault status in a computer system, comprising:

with a system controller, providing a polling module and a fault diagnosing module in a computer system;
in data storage, storing a prior state for a sensor associated with a component of the computer system;
receiving a sensor reading including a present state of the sensor; and
when the prior state of the sensor is an unreadable state, triggering resending of a faulty event to the fault diagnosing module.

2. The method of claim 1, wherein the component is a field replaceable unit (FRU), the sensor enters the unreadable state when the FRU is removed from the computer system, and the receiving of the sensor reading occurs after the FRU is reinserted into the computer system.

3. The method of claim 1, further comprising, prior to the triggering of the resending of the faulty event, deteimining with the polling module that the sensor is in a non-nominal state.

4. The method of claim 3, further comprising, with the fault diagnosing module, reporting the component as present and faulty.

5. The method of claim 4, further comprising storing in the data storage a definition of a nominal state for the sensor and wherein the determining the sensor is in the non-nominal state comprises accessing the data storage and comparing the present state with the nominal state definition.

6. The method of claim 5, wherein the prior state stored in data storage comprises one or more readings from the sensor related to operation of the component and wherein the determining the sensor is in the non-nominal state includes processing the one or more reading with the present state of the sensor to determine whether the sensor complies with the nominal state definition.

7. The method of claim 1, wherein the system controller is configured to provide an intelligent platform management interface (IPMI) and wherein the triggering of the resending of the faulty event includes operating the IPMI to send an IPMI event to the fault diagnosing module.

8. The method of claim 7, wherein the IPMI event comprises a previously sent IPMI fault event for the sensor.

9. A computer system with accurate fault status tracking of sensors, comprising:
a field replaceable unit (FRU);
a sensor associated with the FRU operating to transmit sensor readings associated with an operating status of the FRU; and
a system controller including an intelligent platform management interface (IPMI) module and a fault diagnosing module, wherein the IPMI module operates, in response to the sensor readings, to emit IPMI events to the fault diagnosing module for diagnosing status of the FRU and wherein the IPMI module operates to re-emit at least a portion of the IPMI events to enhance the accuracy of the FRU status diagnosing.

10. The computer system of claim 9, further including memory storing a prior state of the sensor and wherein the IPMI module re-emits the portion of the IPMI events when the sensor readings are received when the prior state of the sensor is an unavailable state indicating the FRU was removed from the computer system.

11. The computer system of claim 10, wherein the system controller further provides a poller determining, when the prior state is an unavailable state, whether the sensor is presently in a non-nominal state and, when the sensor is in the non-nominal state, causing the re-emitting of the at least a portion of the IPMI events to the fault diagnosing module.

12. The computer system of claim 11, wherein the memory further stores a definition of a nominal state for the sensor and wherein the determining of the non-nominal state by the poller comprises comparing one of the sensor readings received after the unavailable state with the nominal state definition.

13. The computer system of claim 12, wherein the nominal state definition comprises a nominal operating range including at least one threshold value.

14. The computer system of claim 9, wherein the computer system comprises a server, the FRU comprises a removable processor, and the IPMI module acts to re-emit the portion of the IPMI events when the sensor transitions from unreadable to readable with a prior state and a present state of the sensor indicated by the sensor readings both being faulty.

15. A computer program product comprising a non-transitory computer useable medium and computer readable code embodied on the non-transitory computer useable medium for performing accurate fault status tracking of sensors associated with components of a computer system, the computer readable code comprising:
 computer readable program code devices configured to cause the computer system to receive input from a sensor associated with a component of the computer system;
 computer readable program code devices configured to cause the computer system to access memory to determine whether a stored prior state of the sensor is equal to unreadable; and
 computer readable program code devices configured to cause the computer system to, when the prior state of the sensor is unreadable, resend a previously transmitted fault event to a fault diagnosing application for diagnosing a status of the component.

16. The computer program product of claim 15, wherein the previously transmitted fault event is resent when the sensor is determined to be in a non-nominal state.

17. The computer program product of claim 16, wherein the non-nominal state is determined based on two or more inputs received from the sensor to identify a state transition for the component over a period of time.

18. The computer program product of claim 16, wherein the determination of the non-nominal state is based on a comparison of the input received from the sensor with a nominal state definition stored in data storage of the computer system, the nominal state definition including a threshold value for the sensor.

19. The computer program product of claim 15, wherein the component is an FRU such that the sensor is assigned an unreadable state when the FRU is removed from the computer system and wherein the resending of the previously transmitted fault event is performed after the FRU is reinserted, or a replacement FRU is inserted, into the computer system.

20. The computer program product of claim 15, wherein the previously transmitted fault event comprises an IPMI event and the IPMI event is resent when a current state of the sensor indicates the component is in a state associated with the previously transmitted fault event.

* * * * *